Figure 1:
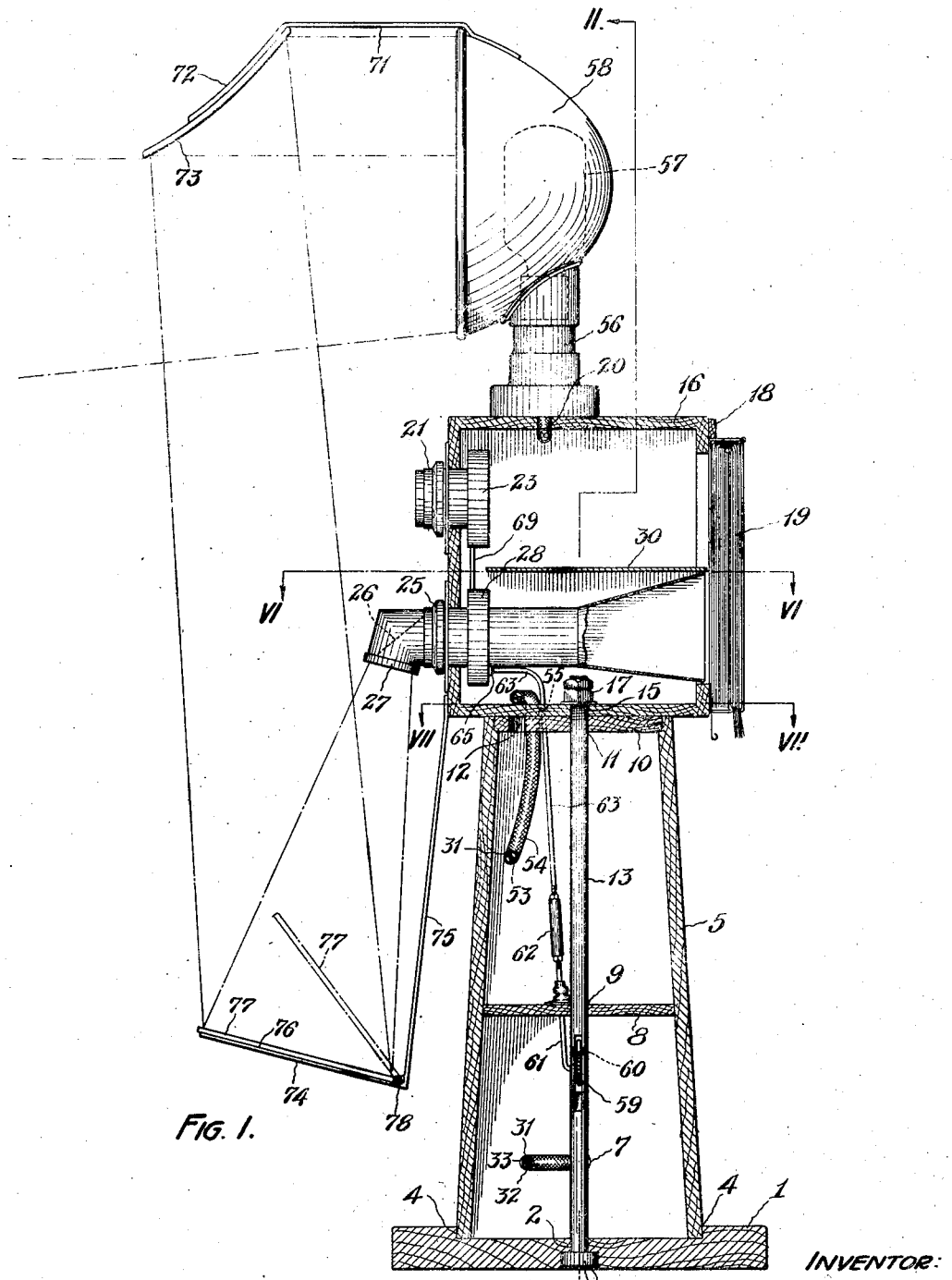

INVENTOR:
VICTOR C. ERNST

Oct. 18, 1927.
V. C. ERNST
1,645,590
PHOTOGRAPHIC APPLIANCE
Filed June 2, 1923   6 Sheets-Sheet 2
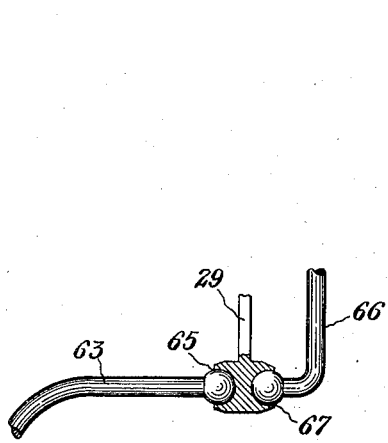
FIG. IV.
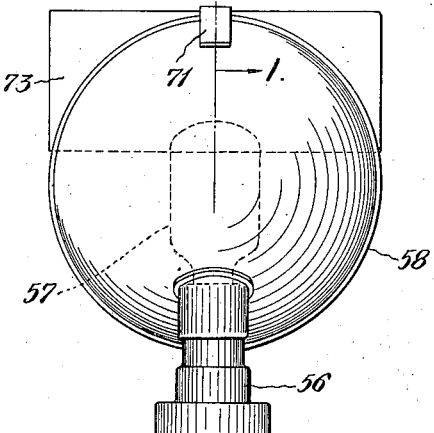
FIG. II.
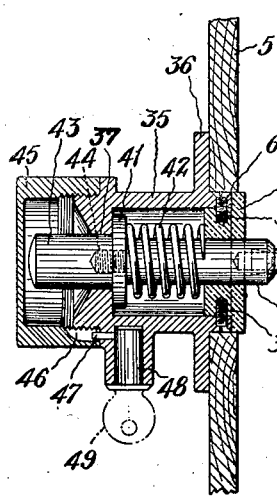
FIG. III.
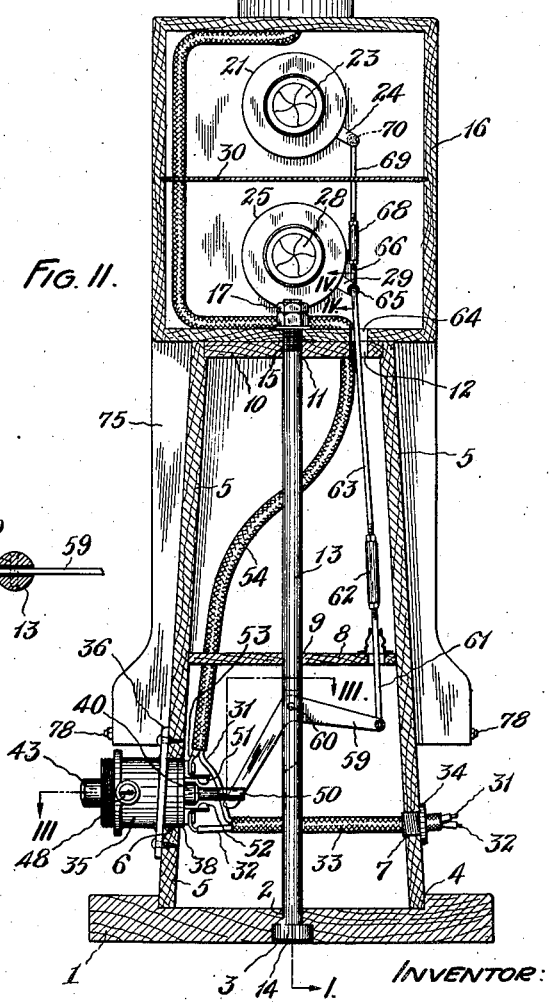
INVENTOR:
VICTOR C. ERNST
By his atty.

Oct. 18, 1927.                                                        1,645,590
V. C. ERNST
PHOTOGRAPHIC APPLIANCE
Filed June 2, 1923                       6 Sheets-Sheet 3
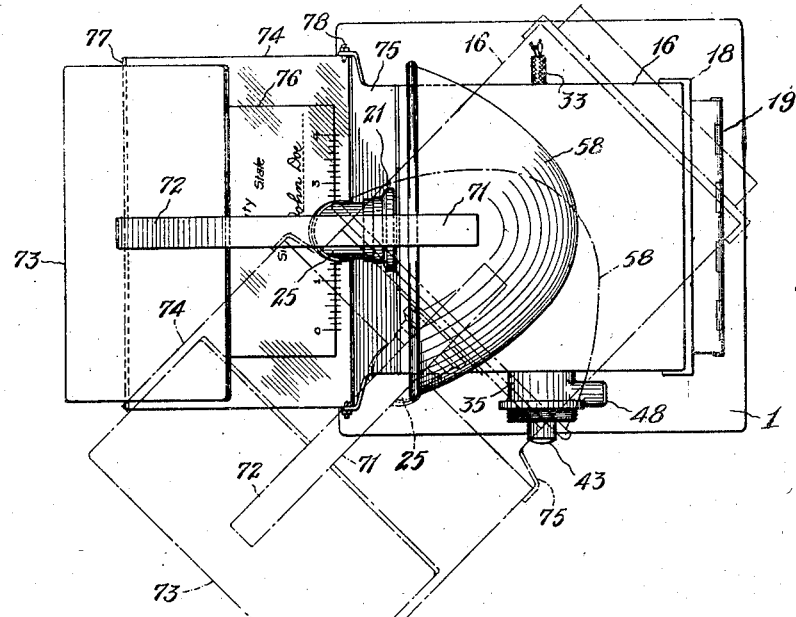
FIG. V.
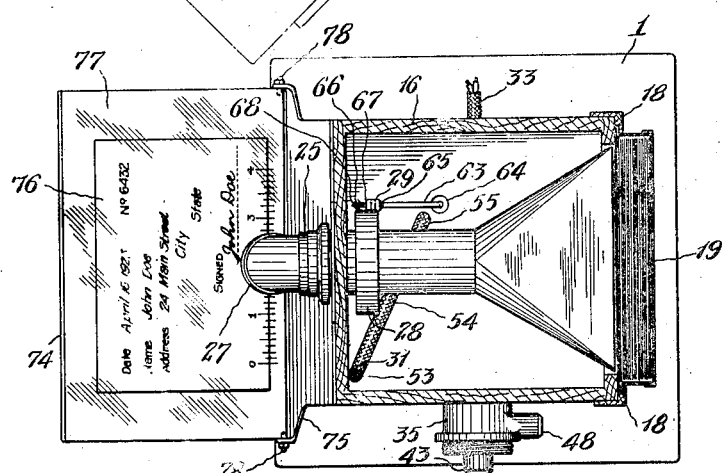
FIG. VI.
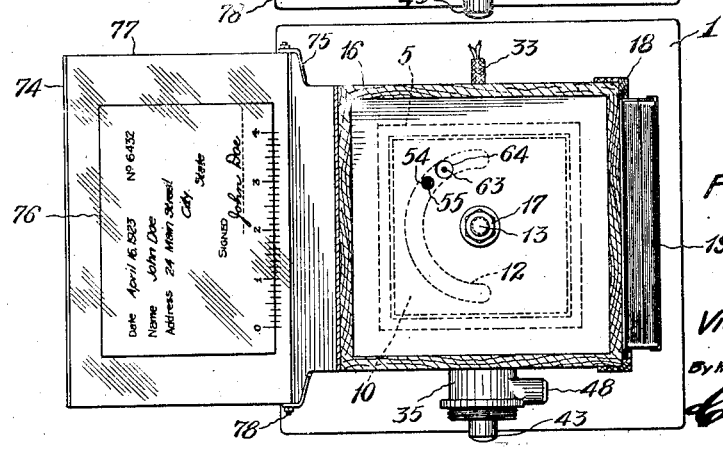
FIG. VII.
INVENTOR:
VICTOR C. ERNST
By his atty.

Oct. 18, 1927.
V. C. ERNST
1,645,590
PHOTOGRAPHIC APPLIANCE
Filed June 2, 1923          6 Sheets-Sheet 4
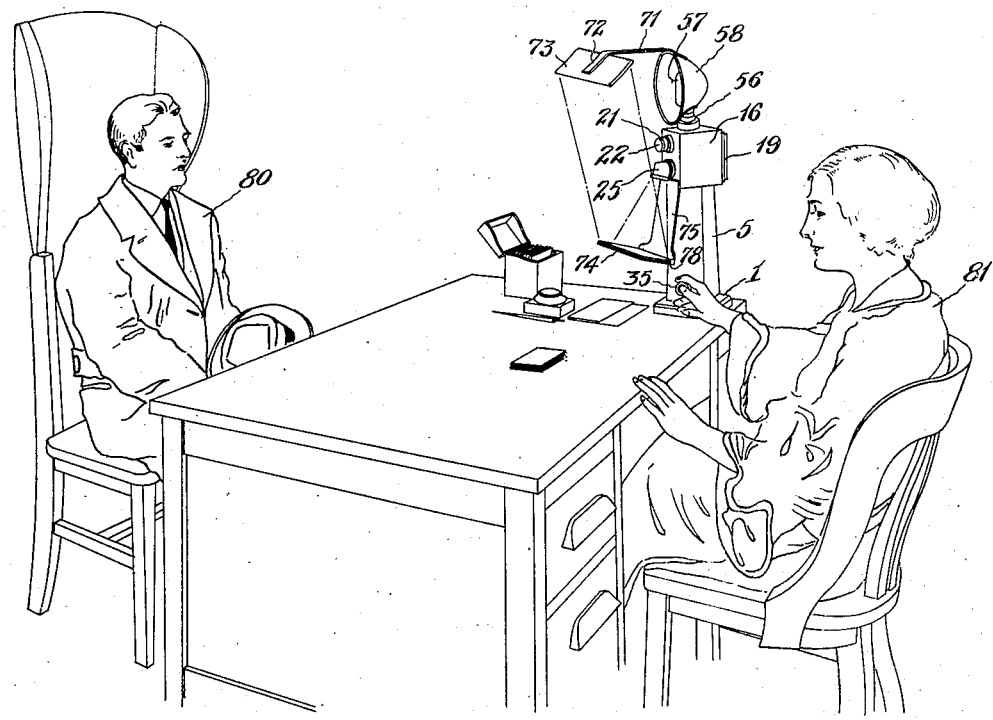
FIG. VIII.
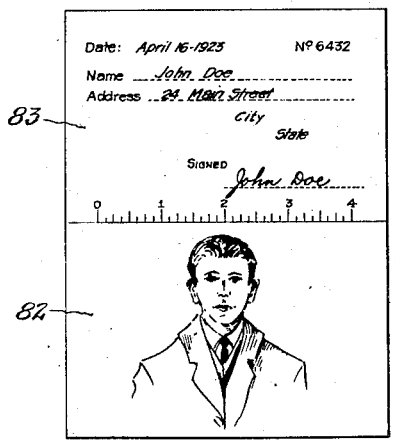
FIG. IX.
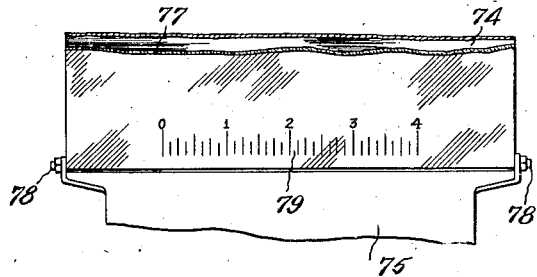
FIG. X.
INVENTOR:
VICTOR C. ERNST
By his att'y.

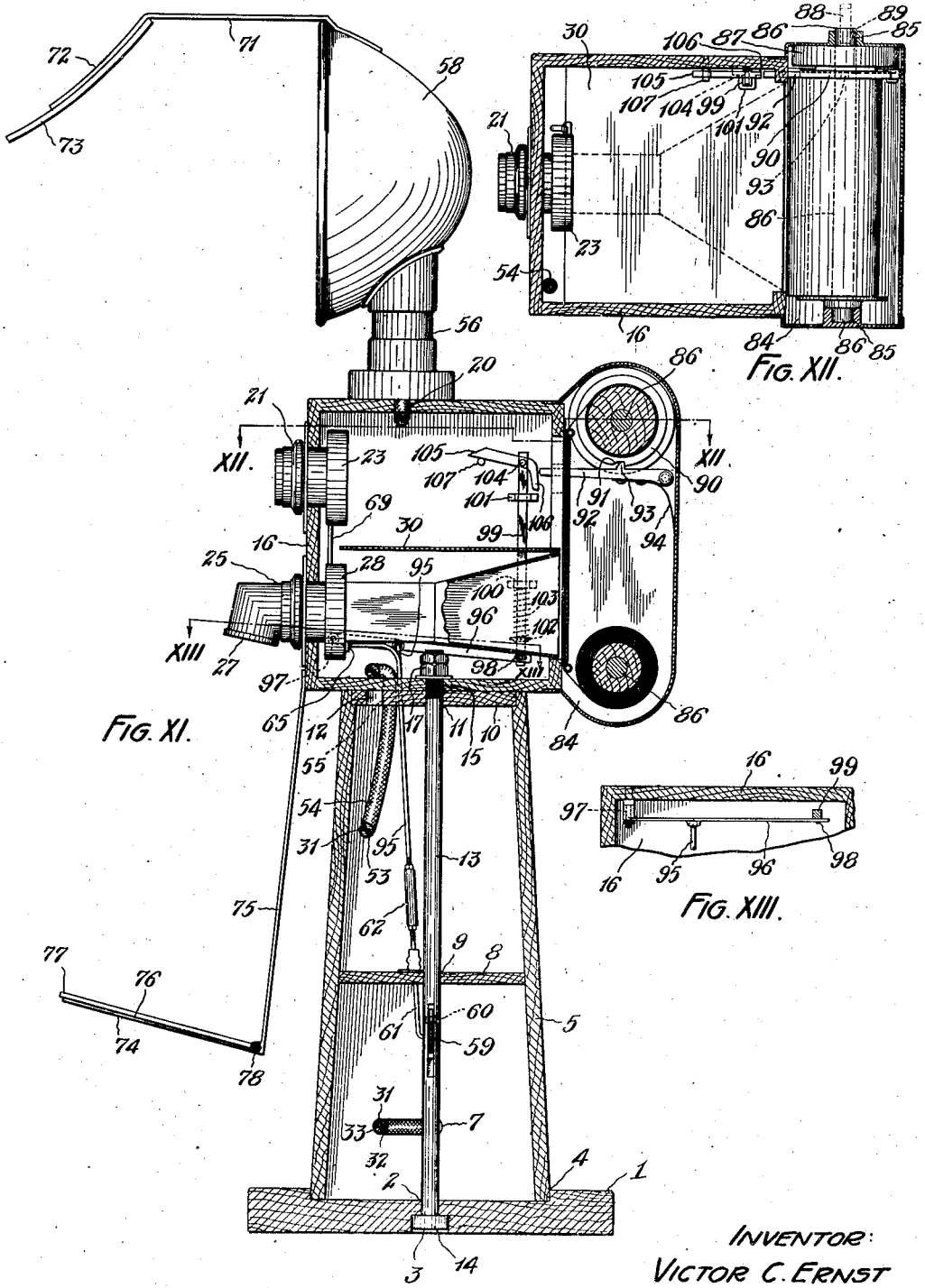

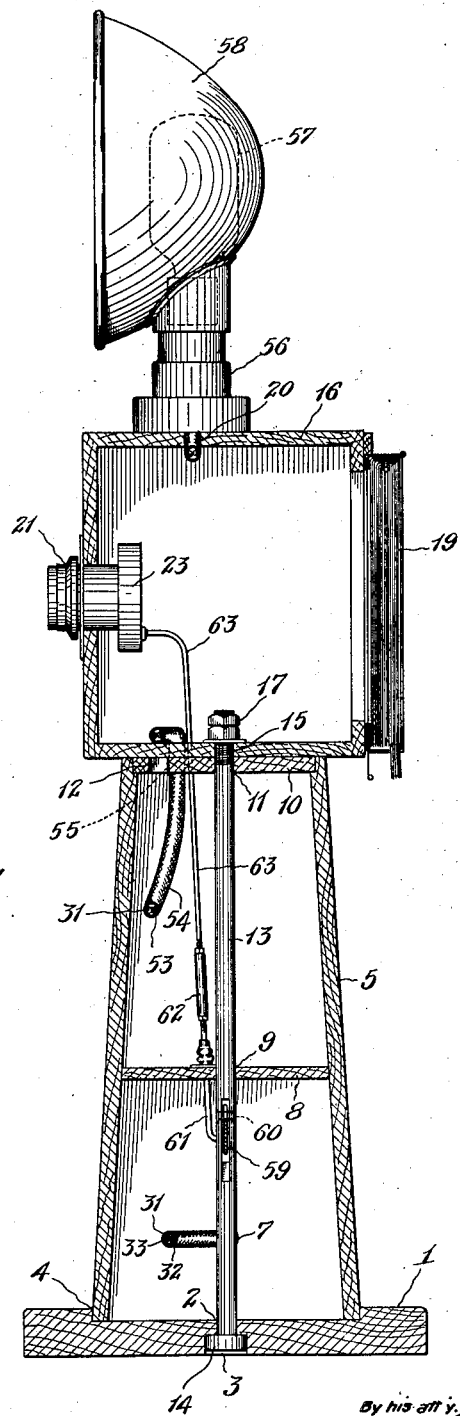
FIG. XIV

Patented Oct. 18, 1927.

1,645,590

UNITED STATES PATENT OFFICE.

VICTOR C. ERNST, OF LAKEWOOD, OHIO.

PHOTOGRAPHIC APPLIANCE.

Application filed June 2, 1923. Serial No. 643,063.

My invention relates to a photographic appliance and more particularly to the combination with a camera or cameras of a controllable source of light together with mechanism whereby the presence or absence of definitely directed illumination is controlled in predetermined timed relation with respect to the actuation of the operating mechanism of one or more of the cameras.

The object of my invention is to provide an appliance, preferably as a compact unitary structure, to be used for recording photographically, correlated information for subsequent reference as a positive and certain identification of a person with whom the possessor of the appliance may be having or intending to have business relations. For instance, it is manifestly of great importance for banks to have some improved readily obtainable record enabling their personnel reliably to identify a business patron or business transaction. An appliance embodying my invention will, upon actuation of mechanism subject to simple manual control direct natural or artificial light rays toward one or more objects and during the illumination cause one or more photographs to be taken. As exemplified by the drawings, light will be flashed toward a person placed in the field of view of an objective and simultaneously reflected toward a card likewise in the field of view of an objective and upon which has been written data pertaining to the person being photographed. Variations are comprehended enabling a differing relation in the time periods of the exposures of the desired images, and in respect to structural modifications.

According to the present invention, however, I provide a photographic appliance having two objectives, adapted simultaneously to take pictures on the same sensitized element of a person and a card or record sheet, displaying a description or otherwise pertaining to said person including a card holder accessibly arranged outside of the camera.

The invention further provides a camera as described in the preceding paragraph having connected therewith a source of light adapted simultaneously to illuminate the person and the card holder.

Adverting to the drawings:

Figure I is mainly a vertical longitudinal section showing a photographic appliance embodying my invention.

Figure II is a vertical cross section on line II—II of Figure I.

Figure III is an enlarged plan section on line III—III of Figure II.

Figure IV is an enlarged section on line IV—IV of Figure II.

Figure V is a top plan view of my appliance showing its upper portion also in an alternative position indicated by dotted lines.

Figure VI is a plan section on line VI—VI of Figure I.

Figure VII is a plan section on line VII—VII of Figure I.

Figure VIII is a perspective view showing the method of using my photographic appliance, the upper part being shown to occupy the position indicated by the dotted lines in Figure V.

Figure IX is a plan view of one of the double photographs obtained by the use of my invention.

Figure X is an enlarged and broken plan view of an edge of one detail.

Figure XI is mainly a vertical longitudinal section of a modified form of my invention, wherein a roll film with automatic feed mechanism is substituted for the film pack.

Figure XII is a plan section on line XII—XII of Figure XI.

Figure XIII is a fragmentary plan section on line XIII—XIII of Figure XII.

Figure XIV is mainly a vertical longitudinal section of a simplified modification.

A base 1 is provided with a central bore 2 enlarged or countersunk at 3 and around its upper end bordered by a square recess 4 in which is seated a hollow pedestal 5 provided on one side with an opening 6 and on its opposite side with a smaller opening 7. The pedestal 5 is divided and reinforced by a partition 8 having a central opening 9, and the pedestal 5 is further supplied with a top 10 likewise fashioned with a central opening 11 and also with a segmental slot 12 indicated by dotted lines in Figure VII and the purpose of which will hereinafter appear. A bolt 13 has its head 14 occupying the countersunk 3 and is passed upwardly through the openings 9 and 11 and through an opening 15 in the bottom of a camera 16. A nut and lock nut combination 17 cooperating with the upper screw threaded end of the bolt 13 within the camera 16 serves to effect a swivel connection between the pedestal 5 and the camera compartment 16 enabling the latter to be turned about the bolt 13 as an axis and as indicated by the dotted lines in Figure V.

The back of the camera compartment 16 is fashioned on opposite vertical sides with channels 18 for the insertion, in a manner common to the art, of a film pack 19. The top of the camera compartment 16 is provided with an opening 20 shown in Figure I. The upper front of the camera compartment carries a cylindrical structure 21 provided exteriorly of the compartment with a lens 22 which is so designated in Figure VIII and interiorly of the compartment is provided with a shutter 23, shown in Figure II, and controlled by a lever 24. The lower front of the camera compartment similarly has fitted in it a hollow structure 25 including a lens (not shown) and in front of the lens a prism 26 adapted to receive light rays entering from below through a filter 27 and to reflect them through the lens. The parts just described may be seen in Figure I. Interiorly of the camera compartment the structure 25 has operatively mounted in it a shutter 28 controlled by a lever 29 as may be seen in the Figure II. The camera compartment is divided by a horizontal partition 30 to prevent halations, due to light rays through one lens reaching the sensitized surface to which the other lens properly transmits an image.

Directing attention to Figures II and III, electric wires 31 and 32 bound in an insulating cable 33 enter the pedestal 5 through a detachable plug 34 which is fitted in the opening 7. A tubular casing 35 is fitted in the opening 6 and carries exteriorly of the pedestal 5 a flange 36 through which screws are passed to secure it to the pedestal. The casing 35 has its outer end fashioned with a bore 37 and on its inner end encloses a collar 38 detachably held in place by machine screws 39. A metal plunger 40 is movable through the collar 38 and carries interiorly of the casing 35 a flange 41 adapted to abut a shoulder surrounding the bore 37 and normally held thereagainst by a spring 42. A manually reciprocable and insulated push button 43 is detachably connected with the screw threaded outer end 44 of the plunger 40 so as to be movable in the bore 37 inwardly against the action of the spring 42 and so as to move the plunger 40 along with it. The casing 35 is closed by a screw cap 45 covering the button 43. The cap 45 is fashioned on one side with a cavity 46 into which a plunger 47 of a cylinder lock 48 is adapted to project to prevent unscrewing of the cap 45. The movement of the plunger 47 to its unlocking position is controlled by a key 49.

The inner end of the plunger 40 carries an insulating fork 50, and on opposite sides of the inner end of the plunger 40 the casing 35 carries a pair of yieldingly mounted contacts 51 and 52 which the plunger 40 is adapted to engage and spread apart when the button 43 is pressed in. The wire 32 is connected with the terminal 52, whereas the wire 31 together with another wire 53 which is connected with the terminal 51 are conducted through a cable 54 leading up through the segmental opening 12 through an appropriate opening 55 in the bottom of the camera compartment 16, through the opening 20 in the top of the camera compartment and through a socket 56 carried by the camera to an electric lamp 57 disposed in a reflector 58.

The fork 50 straddles one end of a bell crank lever 59 pivoted to the bolt 13 at 60. The other end of the lever 59 articulates with a link 61 passing up through the partition 8 and having an adjustable turn buckle connection at 62 with a rod 63 which passes upwardly through the segmental opening 12 and through an opening 64 in the bottom of the camera to have a ball and socket connection at 65 with the end of the lever 29. An elbow 66 also has a ball and socket connection at 67 with the lever 29. The ball and socket connections just specified constitute universal joints and are clearly shown in Figure IV. The upper end of the elbow 66 is adjustably connected by means of a turn buckle 68 with a rod 69 which also has a ball and socket articulation at 70 with the shutter operating lever 24. The turn-buckle adjustments permit of varying the time of initiation of the upper shutter by itself or of both shutters together.

The upper end of the reflector 58 supports a bracket 71 with a bent extremity 72 on the lower side of which is carried a mirror 73 adapted to reflect light received from the lamp 57 downwardly toward a shelf 74 extending out from a bracket 75 which depends from the lower front edge of the camera. An identification card 76 supplied for instance with a serial number, a date, the name and address of a person and with his signature is to be laid upon the shelf 74 and held in place by a transparent glass cover 77 hinged at 78. As is illustrated in Figure X one edge of the glass cover 77 is fashioned with a linear scale 79 which may be etched on its lower surface. In Figure VIII is shown the subject 80 whose picture is to be taken and an operator 81 engaged in obtaining photographs at substantially the same time of the man and of his identification card, the photograph 82 of the man and the photograph 83 of the identification card being recorded on a single sensitized element to give a unitary photograph as shown in Figure IX.

The operation of my appliance is as follows:

A man 80 doing business, for instance, with a bank will take a seat opposite an employee 81 who, after first supplying a card 76 with the desired typewritten data and procuring thereon the signature of the person, will insert such card face up between the shelf 74 and the glass cover 77 and will then turn the camera 16 upon the pedestal 5 so that the rays from the lamp 57 may be reflected toward the man 80 and so that the latter will be in the field of view of the lens 22. The card 76 is properly focused in the field of view of the lens in the structure 25 as reflected by the prism 26. The filter 27 will be chosen so as to effect the desired color separation. Some of the light rays from the lamp 57 will be caught and reflected by the mirror 73 onto the card 76. It will be supposed that the plunger 47 will have been withdrawn by the turning of the key 49 to have permitted the unscrewing of the cap 45. The operator 81 has then merely to press the button 43 to actuate mechanism whereby the photographs 82 and 83 are obtained in timed relation. The time of exposure as controlled by the shutters 23 and 28 will usually not be the same, but that is a simple matter of adjustment according to common practice depending upon the speeds at which the shutter mechanism shall have been elected to be set. During the turning movement of the camera 16 relative to the pedestal 5 the arc of movement of the cable 54 and of the rod 63 will be along the segmental slot 12.

When the button 43 is pushed in the plunger 40 will rub the contacts 51 and 52 to close the electric circuit and energize the lamp 57. Simultaneously, the inward movement imparted to the fork 50 will rock the lever 59 to shove up the rods 63 and 69 and hence operate in unison the shutter control levers 24 and 29 thereby exposing in predetermined timed relation the two sections of the film which is positioned at the focal plane of the camera. As soon as pressure is released from the button 43 the light will be extinguished owing to the spring 42 having withdrawn the plunger 40 and broken the circuit.

The scale 79 is etched or otherwise fashioned on the glass cover 77 will enable ready calculation of the size of the image which is to be photographically recorded. The scale 79 is placed on the lower side of the glass cover so that it will be in the same proper focus as the card 76. Hence, when photographed the scale will register the size of the image or one dimension of the card. In case of any test in a court the size of the original card will be proven by its measurement and comparison with the photographed scale bordering its reproduction.

The modification shown on sheet 5 discloses the substitution for the film pack 19 of a compartment 84 provided with two sets of bearings 85 in which are mounted the spindles 86 of a pair of film spools on one of which a roll of film is to be unwound and on the other wound and such winding and unwinding will be an intermittent action automatically performed in time periods determined by the frequency with which photographs will be made. The casing 84 is further provided at one end with space for the insertion of a spring motor 87 to be wound by the insertion of a key 88 in a square opening 89. Inasmuch as nothing is claimed for the mechanism for controlling the motor 87, it being old in many arts, the description thereof has been cursory.

The automatically operating intermittent actuation involves an escapement including a disc 90 notched at 91 together with a pivoted lever 92 provided with a detent 93 normally shoved upwardly by a spring 94.

An actuation rod 95 connected with the bell crank lever 59 articulates at its upper end with an interjacent portion of a lever 96 having its one end pivoted at 97 and its other end articulating in turn with a push rod 99 which is guided for up and down movement in guides 100 and 101. The rod 99 fixedly carries a collar 102 and is surrounded between the guide 100 and the collar 102 by a spring 103 normally active to force the collar 102 and hence the rod 99 downwardly. The upper end of the rod 99 has pivoted to it at 104 a trigger 105 one end 106 of which depends and is adapted during the upward movement of the rod 99 idly to rub past the free end of the lever 92. During the spring actuated return of the rod 99 downwardly the one end of the trigger 105 will bear against a stop 107 thereby compelling the other end to force down the lever 92 and in so doing cause the detent 93 to be withdrawn from the notch 91 whereupon the spring motor 87 will cause the upper spindle 86 to make one complete turn and shift another film into place in the focal plane of the camera before the detent 93 is again permitted to slip into the notch 91 and stop turning movement of the film.

The simplified modification illustrated on sheet 6 corresponds to the disclosure of Figure I with the omission of the second or lower objective, of the mirror and of the shelf. For some business purposes a photograph of a patron or customer will suffice.

I claim:

1. Apparatus of the character described comprising the unitary combination of a photographic appliance including a pair of objectives having different fields of view for comprehending different objects of interrelated significance while having a common focal plane, means for illuminating both objects and mechanism for simultaneously operating said illuminating means and for controlling the admission of light through both objectives, distinct connections of parts of said mechanism being selectively adjustable.

2. Apparatus of the character described comprising the unitary combination of a pair of cameras for photographing different objects, means for illuminating both objects and mechanism for operating both cameras and for controlling said illuminating means in timed relation, said mechanism including an adjustable connection with said means and another adjustable connection between said cameras whereby the operation of either or both cameras may be selectively synchronized with respect to the time of operation of said means.

3. In combination, photographic apparatus comprising sensitized areas, a light, means for controlling said light, a shutter for controlling the exposure of each area to light, and a selectively controllable connection between said means and shutter whereby the duration of their actions may be varied.

4. As a unitary photographic structure, the combination of a pair of objectives having the same focal plane, a sensitized element disposed in said plane, shutters for said objectives respectively, a lamp, means for operating said shutters and means for lighting said lamp, said means being connected, one being adjustable and one adapted automatically to be operated by the other.

5. As a unitary structure, the combination of a box, a photographic appliance incorporated in said box comprising two objectives comprehending different fields of view and further comprising a single sensitized element in the focal plane of both objectives, an electric lamp carried by said box, a reflecting element for directing the light to an object in one field of view, and means including an adjustable connection for operating said cameras and for lighting said lamp in selectively timed relation.

6. An appliance of the character described, comprising the combination of duplex photographic apparatus including objectives having distinct fields of view with angularly related axes and also including shutters, means for illuminating objects placed in both fields of view and mechanism interconnecting said shutters and illuminating means whereby they may be operated together in predetermined time relation.

7. A photographic appliance comprising the combination of photographic apparatus having distinct fields of view, single selectively controllable means for illuminating objects placed in both fields of view during predetermined time periods, and means for operating said means and apparatus in timed relation.

8. A photographic appliance comprising the combination of photographic apparatuses including objectives having distinct fields of view together with shutters, single adjustably controllable means for illuminating objects placed in both fields of view during predetermined time periods, and mechanism for operating both shutters and for controlling said illumination means in timed relation.

9. A photographic appliance comprising the combination of a hollow support, a pair of cameras carried by said support, a controllable source of illumination, and mechanism within said support for simultaneously operating said cameras and said illumination, said mechanism including an adjustable connection adapted to vary the time of initiation of one of said operations.

10. A photographic appliance comprising the combination as a unitary structure of a hollow support provided exteriorly with a shelf, a pair of cameras built in said support and including objectives one of which includes a reflecting element to comprehend said shelf in its field of view, an electric lamp carried exteriorly by said support and mechanism within said hollow support for simultaneously controlling the operation of said cameras and the energizing of said lamp.

11. A photographic appliance comprising the combination as a unitary structure of a camera including an objective, a support for an object to be photographed and comprehended by the field of view of said objective, a glass cover movably carried by said support and fashioned along one edge and on its lower side with a scale, controllable means for illuminating said support, and mechanism for operating said camera and illuminating means in timed relation.

12. In combination, a camera, a pair of objectives and a pair of shutters, an artificial source of light, and mechanism for operating said shutters and for flashing said light in timed relation said mechanism including adjustable means to permit of varying the relation of the time period of the lighting effect with respect to said shutter actions.

13. In combination, photographic apparatus comprising sensitized areas, a light, means for controlling said light, a pair of shutters adjustable in action for controlling the exposure of said areas respectively to said light, and a mechanical operating connection between said means and shutters a part of said connection being adjustable whereby the actions of said shutters may be selectively synchronized.

14. In combination, photographic apparatus comprising sensitized areas, a light, means for controlling said light, a pair of shutters adjustable in action for controlling the exposure of said areas respectively to said light, an adjustable connection between said means and one shutter and an adjustable connection between said shutters whereby the actions of one of said shutters may be selectively synchronized singly or together with the other shutter with reference to the operation of said light controlling means.

15. In combination, photographic apparatus comprising sensitized areas, a light, means for controlling said light, shutters for controlling the exposure of said areas respectively to said light, and adjustable connection between said means and one shutter whereby its action may be selectively synchronized and distinct adjustable means adapted to alter the time of initiation of action of the other shutter.

16. A photographic appliance comprising the combination of a camera including an objective, a support for an object to be photographed and comprehended by the field of view of said objective, a glass cover carried by said support, one of said last mentioned associated elements being fashioned along one edge with a scale appearing to view, controllable means for illuminating said support, and single interconnected mechanism for operating said camera and illuminating means in timed relation.

17. In a photographic appliance, the combination of a camera including a sensitized element, two objectives adapted simultaneously to take pictures on said sensitized element of a person and of a record card pertaining to said person, an illuminating device for simultaneously illuminating the person and the card while suitably placed, shutters for said objectives, said shutters and illuminating device being actuable by one manually operable means including rods, so that the time relation between the operation of said shutters and the illuminating device may be predetermined to suit prevailing conditions.

18. A photographic appliance as set forth in claim 17, including turn-buckles connecting certain of the rods which connect the actuating means with the shutters.

19. A photographic appliance as set forth in claim 17, having a base, said appliance being rotatably supported on said base, and wherein one of the rods connecting the shutters with the actuating means extends through a curved slot provided in the top of said base to permit of rotation of the appliance containing the shutters with respect to the base carrying the actuating means.

Signed by me, this 17th day of May, 1923.

VICTOR C. ERNST.